United States Patent
Bekas et al.

(10) Patent No.: US 10,824,674 B2
(45) Date of Patent: Nov. 3, 2020

(54) LABEL PROPAGATION IN GRAPHS

(71) Applicant: International Business Machines Corporation, Armonk, NY (US)

(72) Inventors: Konstantinos Bekas, Horgen (CH); Robin Devooght, Rueschlikon (CH); Peter Willem Jan Staar, Wädenswil (CH)

(73) Assignees: International Business Machines Corporation, Armonk, NY (US); UNIVERSITÈ LIBRE DE BRUXELLES BRUXELLES (BE)

( * ) Notice: Subject to any disclaimer, the term of this patent is extended or adjusted under 35 U.S.C. 154(b) by 451 days.

(21) Appl. No.: 15/173,544

(22) Filed: Jun. 3, 2016

(65) Prior Publication Data

US 2017/0351681 A1    Dec. 7, 2017

(51) Int. Cl.
*G06F 16/901*    (2019.01)
*G06N 20/00*    (2019.01)
*G06F 16/2457*    (2019.01)

(52) U.S. Cl.
CPC .... *G06F 16/9024* (2019.01); *G06F 16/24578* (2019.01); *G06N 20/00* (2019.01)

(58) Field of Classification Search
CPC .......... G06F 16/24578; G06F 16/9024; G06N 20/00
See application file for complete search history.

(56) References Cited

U.S. PATENT DOCUMENTS

| | | | |
|---|---|---|---|
| 6,360,227 B1 * | 3/2002 | Aggarwal | G06F 17/30873 |
| 8,793,283 B1 | 7/2014 | Austern | |
| 8,990,209 B2 * | 3/2015 | Narang | G06Q 10/04 707/736 |
| 9,269,055 B2 * | 2/2016 | Kushnir | G06N 99/005 |
| 9,384,571 B1 * | 7/2016 | Covell | G06T 11/206 |

(Continued)

OTHER PUBLICATIONS

Shuman et al.; "Chebyshev polynomial approximation for distributed signal processing;" 2011 International Conference on Distributed Computing in Sensor Systems and Workshops (DCOSS) (Year: 2011).*

(Continued)

*Primary Examiner* — Ashish Thomas
*Assistant Examiner* — Mellissa M. Ohba
(74) *Attorney, Agent, or Firm* — Daniel Morris; Otterstedt, Wallace & Kammer, LLP (57) ABSTRACT

Each node in a subset of graph nodes has an associated label value indicating a characteristic of the corresponding item. Matrix data and graph label data are stored. The matrix data defines a matrix representing the graph. The graph label data defines a graph label vector indicating label values associated with nodes of the graph. For at least one set of nodes, test label data is generated defining a test label vector. A propagation function is defined, comprising a set of basis functions, having respective coefficients. The coefficients are calculated which minimize a difference function dependent on difference between the graph label vector and a result of applying the propagation function to the test label vector for said at least one set. New label values are calculated for nodes in $\overline{K}$ by applying the propagation function with the calculated coefficients to the graph label vector, thereby propagating labels.

24 Claims, 6 Drawing Sheets

(56) References Cited

U.S. PATENT DOCUMENTS

| | | | |
|---|---|---|---|
| 9,400,834 B2* | 7/2016 | Davies | G06F 17/30958 |
| 9,852,231 B1* | 12/2017 | Ravi | G06N 99/005 |
| 2011/0314367 A1 | 12/2011 | Chang | |
| 2012/0089552 A1* | 4/2012 | Chang | G06N 5/02 706/52 |
| 2015/0052098 A1* | 2/2015 | Kveton | G06F 17/30731 706/52 |
| 2015/0220534 A1* | 8/2015 | Constantine | G06N 7/005 707/748 |

OTHER PUBLICATIONS

Michele Covell et al. Efficient and accurate label propagation on large graphs and label sets. Proceedings International Conference on Advances in Multimedia, IARIA (2013). pp. 1-7.

Johan Ugander et al. Balanced label propagation for partitioning massive graphs. Sixth ACM WSDM Conference, Feb. 4-8, 2013. pp. 1-11.

Zhuoyi Zhao et al., From dense subgraph to graph matching: a label propagation approach. 2014 International Conference on Audio, Language and Image Processing (ICALIP). pp. 301-306.

Xiangyu Chen et al. Large-scale multi-label propagation based on efficient sparse graph construction. ACM Transactions on Multimedia Computing, Communications and Applications, vol. 6, No. 3, Article 4, Publication date: May 2013. pp. 1-23.

Smola and Kondor, "Kernels and regularization on graphs", Learning theory and kernel machines, pp. 144-158, Springer, 2003.

Zhou et al., "Learning with local and global consistency", Advances in neural information processing systems, 16(16):321-328, 2004.

Kloumann and Kleinberg, "Community membership identification from small seed sets", Proceedings of the 20th ACM SIGKDD conference, pp. 1366-1375, ACM, 2014.

Olivier Chapelle et al., editors, Semi-supervised learning, MIT Press, Cambridge, MA, and London, England, 2006 pp. i-509, especially benchmarks pp. 377-393 available online at http://olivier.chapelle.cc/ssl-book/benchmarks.

* cited by examiner

$$F(l) = \begin{bmatrix} P_0(\Delta)l & \cdots & P_j(\Delta)l & \cdots & P_k(\Delta)l \end{bmatrix}$$

(a) BlogCatalog (b) Flickr

Figure 6

(a) Digit (b) USPS (c) Coil

LABEL PROPAGATION IN GRAPHS

BACKGROUND

The present invention relates generally to label propagation in graphs.

Graphs are used in numerous areas of science and technology to model real-world systems. Such graphs have nodes (also called vertices) which correspond to system items, and edges, connecting pairs of nodes, which indicate some type of correlation, or relationship, between items. One or more labels may be associated with any given node of the graph, where each such label indicates some characteristic of the item corresponding to that node. For example, the value of a particular label may indicate a type, classification, property, feature, etc., of an item in the system represented by the graph. For a given label in many practical applications, the label value may be known for some nodes in the graph but unknown for others. It may then be desirable to use the known graph data to predict label values for nodes whose label value is unknown. This process is known as label propagation, and has a central role in many applications of network science, including link prediction, recommendation systems, community detection, seed set expansion, semi-supervised learning, and many more. The new label values assigned to nodes by the label propagation process may then be used to control operation of the modelled system in some way. As an example, if a graph represents a data processing/communications network with nodes corresponding to devices in the network, some aspect of network operation such as routing, task assignment, network configuration, etc., may be controlled in dependence on the propagated labels.

The label propagation operation can be performed by applying a propagation function to graph labels, where the propagation function is a function of a matrix X defining the graph. The matrix X may, for example, correspond to an adjacency matrix A for the graph, or a matrix derived from the adjacency matrix such as the corresponding Laplacian matrix or a function thereof. Many different propagation functions have been proposed, none of which consistently outperforms the others. Particular examples of known propagation functions include variations on the exponential kernel ($e^{\alpha A}$) and the von Neumann kernel $(I-\alpha A)^{-1}$, where I is the identity matrix. Such known propagation functions are based on the assumption of homophily, which is the notion that elements in a graph are connected to others that share the same properties, and by extension that similar elements are linked by (multiple) short paths.

SUMMARY

According to at least one embodiment of the present invention there is provided a method for propagating labels in a graph having nodes, corresponding to items, and edges, connecting pairs of nodes, indicating correlation between items. Each node in a subset K of the nodes has an associated label value indicating a characteristic of the corresponding item. The method includes storing matrix data and graph label data in memory of a computing system. The matrix data defines a matrix X representing the graph. The graph label data defines a graph label vector Z indicating label values associated with nodes of the graph, wherein the label value for each node in $\overline{K}$ (i.e. the subset of nodes which are not in K and for which the label value is unknown) is set to a predetermined value. The method includes, for at least one set S of nodes in K, generating in the computing system test label data defining a test label vector $l^S$ which corresponds to said graph label vector Z but with the label value for each node in S set to said predetermined value. The method further includes defining in the computing system a propagation function $f(X)$ comprising a set of (k+1) basis functions $P_j(X)$, j=0 to k, having respective coefficients $c_j$. The method additionally includes calculating, in the computing system, the coefficients $c_j$ which minimize a difference function dependent on difference between the graph label vector l and a result of applying the propagation function $f(X)$ to the test label vector $l^S$ for said at least one set S. The method further comprises calculating, in the computing system, new label values for nodes in $\overline{K}$ by applying the propagation function $f(X)$ with the calculated coefficients $c_j$ to the graph label vector l, thereby propagating labels in the graph.

At least one further embodiment of the invention provides a computer program product comprising a computer readable storage medium having program instructions embodied therein, the program instructions being executable by a computing system to cause the computing system to perform such a method for propagating labels in a graph.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described may be performed as computer-implemented methods for propagating labels in a graph. The label propagation methods may be implemented by a computing system comprising one or more general- or special-purpose computers, each of which may comprise one or more (real or virtual) machines, providing functionality for implementing the operations described herein. The label propagation logic of the computing system may be described in the general context of computer system-executable instructions, such as program modules, executed by the computing system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Figure 1:
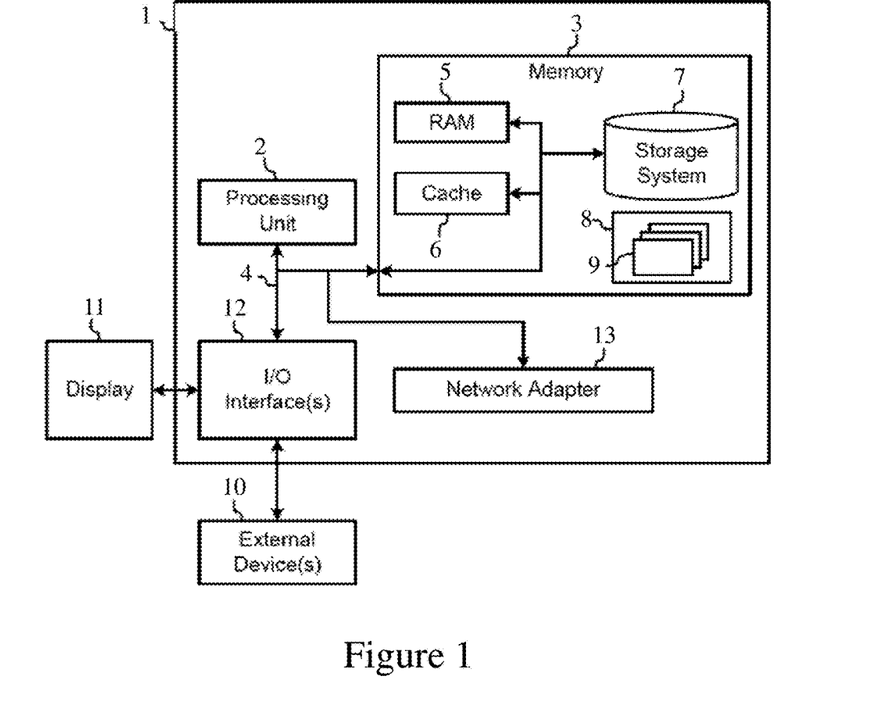
FIG. 1 is a schematic of a computer for implementing label propagation methods embodying the invention.

FIG. 1 is a block diagram of exemplary computing apparatus for implementing label propagation methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
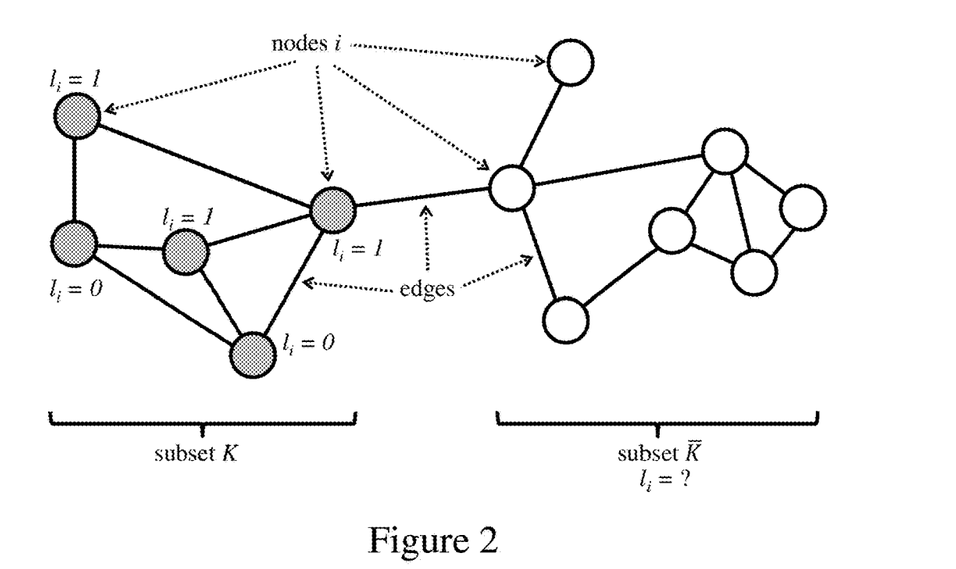
FIG. 2 is a diagram indicating structure of a graph.

FIG. 2 indicates basic elements of a simple example of a graph. The graph has a plurality n of nodes i, i=1 to n, and a plurality N of edges connecting pairs of nodes i. The nodes i correspond to respective items in a system modelled by the graph. A node may, for instance, represent a device in a data processing, communications or other network, a data item such as a document or file stored in a database system, a web page hosted by an Internet server, or any other item in a real-world system. The edges between node pairs indicate some type of correlation between the items represented by those nodes. Edges may, for instance, correspond to physical or logical links between devices in a network system, a relationship or association between data items such as a reference or common classification between documents in a database system, a link between web pages, and so on. One or more labels may be associated with nodes in the graph, where each label indicates some characteristic of the corresponding item. Labels may, for instance, indicate a property, classification, attribute, type or feature of an item, or any other item characteristic. In the FIG. 2 example, each node in a subset K (shown shaded in the figure) of the n nodes has an associated label value, denoted by $l_i$, indicating a particular node characteristic. In the simple example here, the label values correspond to a binary classification indicating membership or otherwise of a defined class $\mathcal{A}$, with a label value $l_i=1$ indicating that node $i \in \mathcal{A}$, and label value $l_i=0$ indicating that node $i \notin \mathcal{A}$. The remaining nodes of the graph have unknown label values $l_i$. These are the nodes in subset $\overline{K}$ in the figure (where the overbar notation $\overline{Y}$ for a set or class Y is used herein, in accordance with convention, to signify the complement of Y, i.e. nodes not in Y). The unknown label values $l_i$ for nodes in $\overline{K}$ can be predicted by a label propagation method described below.

While a simplistic graph is shown in FIG. 2, in practical applications the number n of graph nodes may be of order thousands, millions or more depending on complexity of the modelled system. However, any such graph can be represented by an n×n adjacency matrix A where the matrix elements $a_{ij}$ (i=1 to n, j=1 to n) correspond to edges between pairs of nodes i and j. For example, $a_{ij}=1$ may signify presence of an edge between node i and node j, and $a_{ij}=0$ may signify no edge. (Values other than 0 and 1 may be used here, and weighted graphs may use a range of values for edges with the value for any particular edge indicating an edge weight, or strength of correlation, between the two nodes). The label propagation problem can be expressed in the form:

$$\hat{l} = f(X)l \qquad (1)$$

where X is a matrix defining the graph. This matrix may, for example, be the adjacency matrix A, or a matrix derived from A such has the corresponding Laplacian matrix $\Delta$, or some other function of A or $\Delta$. The vector l in this equation denotes an n×1 label vector whose elements $l_i$ correspond to label values for respective nodes of the graph. In this vector, the element $l_i$ for nodes with unknown label values (e.g. nodes in $\overline{K}$ in FIG. 2) can be set to a predetermined value as discussed further below. The function $f: R^{n \times n} \to R^{n \times n}$ (where R denotes real numbers) is a propagation function which takes the matrix X as argument. The vector $\hat{l}$ is an n×1 vector whose elements $\hat{l}_i$ give the predicted label values for nodes as generated by the label propagation operation. In the example of FIG. 2, therefore, the predicted label vector $\hat{l}$ will give predicted label values for nodes in $\overline{K}$. (In practice, the vector $\hat{l}$ typically gives a fuzzy prediction of the labelling. In the FIG. 2 scenario, for example, predicted label values $\hat{l}_i$ for nodes $i \in \overline{K}$ may be values between 0 and 1. These can be viewed as ranking values from which the assignment of nodes to $\mathcal{A}$ with label values $l_i=1$ can be determined in various ways as discussed further below.)

Figure 3:
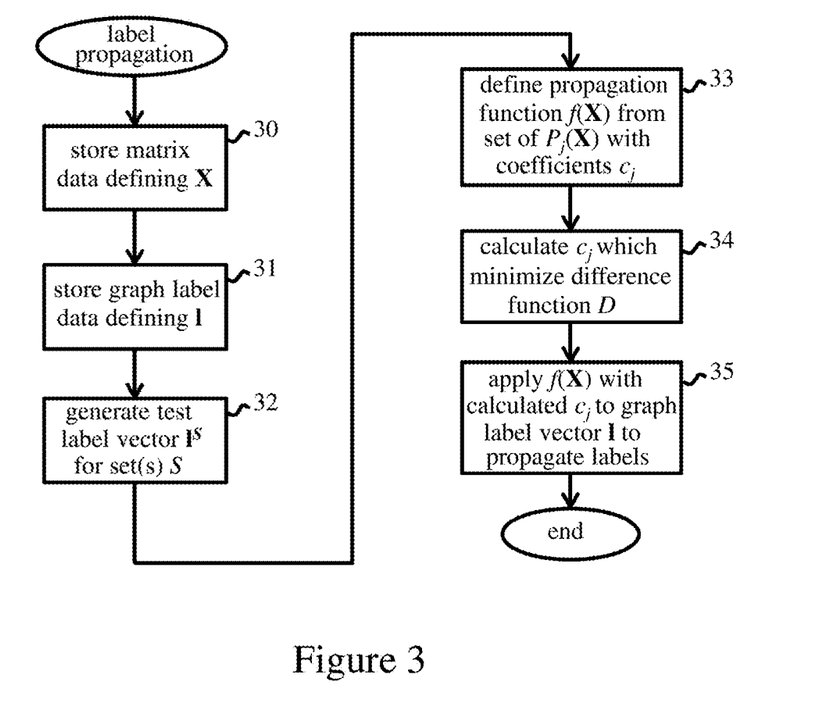
FIG. 3 indicates steps of a label propagation method embodying the invention.

Instead of choosing an arbitrary propagation function $f$, the label propagation methods described below learn a propagation function that best fits the labelled data. In simple terms, these methods artificially hide some known labels and find a function that would predict the correct labelling for the nodes with hidden labels. FIG. 3 indicates steps of the label propagation operation. The order of these steps may vary in different embodiments and steps may be performed in parallel where appropriate.

In step 30 of the FIG. 3 operation, matrix data defining the matrix X representing the graph is stored in memory of the computing system. This matrix data comprises data elements corresponding to the matrix elements $x_{ij}$ (i=1 to n, j=1 to n) of the n×n matrix X. In step 31, graph label data defining the graph label vector l is stored in memory of the computing system. This graph label data indicates label values associated with nodes of the graph. The graph label data thus comprises data elements corresponding to the label values $l_i$ for nodes. The label value for each node in $\overline{K}$, i.e. nodes with unknown labels, is set to a predetermined value in this vector. In step 32, for at least one set S of nodes in K (i.e. nodes with known label values $l_i$), the computing system generates test label data defining the elements of a test label vector $l^S$ for that set S. This test label vector $l^S$ corresponds to the graph label vector l but the label value for each node in S set to the aforementioned predetermined value used for nodes with unknown labels. In effect, therefore, the known label values for nodes in S are hidden in the test label vector. In general here, a test label vector may be generated for a single set S, which may comprise all or a subset of nodes in K, or for a plurality of sets S each comprising a subset of nodes in K. The number of sets S can be selected as appropriate to a given implementation as discussed further below.

As indicated by step 33 of FIG. 3, a propagation function $f(X)$ is defined in the computing system as comprising a set of (k+1) basis functions $P_j(X)$, j=0 to k, having respective coefficients $c_j$. For example, the propagation function $f(X)$ may be defined as a series $f(X)=\Sigma_{j=0}^{k}c_j P_j(X)$. Various basis functions $P_j(X)$ may be used here, and particular examples are given below. In step 34, the computing system then calculates values for the coefficients $c_j$ which minimize a predefined difference function D. This difference function D is dependent on difference between the graph label vector l and a result of applying the propagation function $f(X)$ to the test label vector $l^S$ for the (or each) of the aforementioned set(s) S. The difference function D thus depends on difference between labels predicted using the propagation function $f(X)$ and the known label values in l which were hidden in the test label vector(s) $l^S$. This step is explained in more detail below. The coefficients $c_j$ calculated in step 34 can then be used in step 35 to propagate labels in the graph via Equation (1) above. In particular, new label values for nodes with unknown labels (i.e. nodes in $\overline{K}$) are calculated in step 35 by applying the propagation function $f(X)$ with the calculated coefficients $c_j$ to the graph label vector l.

The above process permits determination of an optimum propagation function $f(X)$ for propagating labels in a graph. Decomposing the propagation function as a set of basis functions $P_j(X)$ provides versatile parametrization of the possible propagation functions, allowing determination of the coefficients $c_j$ as the solution of an optimization problem. This process can be performed efficiently even for very large graphs. By learning the optimal propagation function, difficulties in selecting a particular propagation function for any given application are obviated, and appropriate propagation functions can be obtained from a broader family than previously defined. Moreover, the above process does not rely on the homophily assumption discussed earlier, permitting high-performance label propagation on both homophilic and non-homophilic graphs.

A preferred embodiment of the label propagation method will now be described in more detail. Some preliminaries are described first. The graph in this embodiment is defined by an adjacency matrix A with elements $a_{ij}$, and it is assumed that each of the n nodes of the graph either belongs to or does not belong to a defined class $\mathcal{A}$. Membership of $\mathcal{A}$ is known only for a subset K of the n nodes. The propagation function $f$ takes the normalized graph Laplacian $\Delta$ as argument ($\Delta = I - D^{-0.5}AD^{-0.5}$), where I is the identity matrix and D is the diagonal matrix whose elements are $d_i = \Sigma_j a_{ij}^2$. Each node in the subset K is assigned one of first and second label values, here $l_i = 0$ or $l_i = 1$. In particular, the graph label vector l has elements $l_i$ defined as follows:

$l_i = 1$ for nodes in K which belong to $\mathcal{A}$;
$l_i = 0$ for nodes in K which do not belong to $\mathcal{A}$;
$l_i = 0$ otherwise.

In this embodiment therefore, the label value for nodes in $\overline{K}$ is set to a predetermined value of $l_i = 0$, the same value as that for nodes in K known not to belong to $\mathcal{A}$. In alternative embodiments, however, other label values may be used here as desired. By way of example only, the first and second label values for nodes in K might be set to 1 and −1, and nodes with unknown labels might be assigned a label value of 0. Numerous other alternatives are possible here, and suitable choices for label values will be apparent to those skilled in the art.

The propagation function $f$ in this embodiment in defined as a Chebyshev expansion of order k:

$$f(\Delta) = \Sigma_{j=0}^{k} c_j P_j(\Delta) \qquad (2)$$

where $c_j$ are the coefficients of the Chebyshev expansion and $P_j$ is the $j^{th}$ Chebyshev polynomial (of the second family in this embodiment). The Chebyshev polynomials are constructed using the following recursive definition:

$$P_0(\Delta) = I$$

$$P_1(\Delta) = \Delta$$

$$P_{j>1}(\Delta) = 2P_{j-1}(\Delta) - P_{j-2}(\Delta).$$

(It may be noted here that the above definition is not rigorously correct because the Chebyshev polynomials are only orthogonal if the eigenvalues of its argument are in [−1, 1], while the eigenvalues of $\Delta$ are in fact in [0, 2]. However, this can be dealt with by defining the function g such that $g(X) = f(X+I)$, and computing $f(\Delta) = g(\Delta - I) = \Sigma_{j=0}^{k} c_j P_j(\Delta - I)$. For simplicity of notation however, this transformation is omitted in the following. Alternatively, instead of transforming the matrix $\Delta$, the polynomial definitions can be modified accordingly, both of these approaches being mathematically equivalent).

Figure 4:
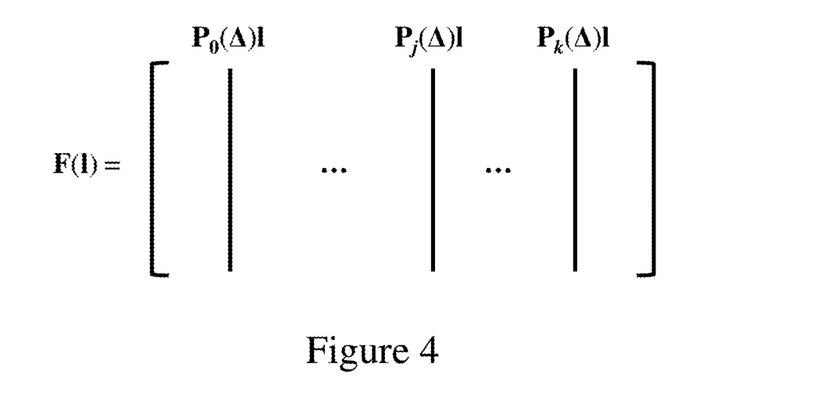
FIG. 4 indicates construction of a matrix in a preferred embodiment.

In this embodiment, a matrix F(l) is defined as shown in FIG. 4. The $j^{th}$ column of F(l) is $P_j(\Delta)l$. With this notation, via Equations (1) and (2), we get:

$$\hat{l} = F(l)c \qquad (3)$$

where c is the column vector of coefficients $c_j$. If the complete labelling l* for the graph were known, the optimal coefficients would be the solution of the following problem:

$$\underset{c}{\text{minimize}} \; \|l^* - F(l)c\|^2 \qquad (4)$$

where $\|x\|$ denotes the vector norm of x. Any vector norm, such as the Euclidean norm, may be used here as desired.

Suppose that i∈K; we define $l^i$ to be identical to l except that $l_i^i=0$ (we hide the label of i). We expect that the optimal coefficients are such that $F(l^i)c=l_i$. This should be true for each node of K, leading to the following problem:

$$\underset{c}{\text{minimize}} \sum_{i \in K} (l_i - F(l^i)c)^2 + \lambda \|c\|^2 \quad (5)$$

The term $\lambda\|c\|^2$ here is a regularization term added to avoid overfitting, and suitable values for λ will be apparent to those skilled in the art. Minimising the difference function expressed in Equation (5) may be performed in some embodiments. However, the number of F matrices that must be computed is equal to the size of K. While those operations could be performed in parallel in some systems, in this preferred embodiment the number of required operations is reduced to accelerate the processing. In particular, the subset K is split into a plurality σ of sets S, denoted by $S_i$ in the following, of equal or almost equal sizes. The number σ of sets $S_i$ can be set as desired according to available processing resources and desired processing speed. By way of example only, σ=10 may be a suitable value in a typical system. For each set $S_i$, a test label vector $l^{S_i}$ is defined as identical to the graph label vector l but with $l_j^{S_i}=0$ $\forall j \in S_i$. Hence, the label value for each node in $S_i$ is set to 0 (hidden) in the test label vector $l^{S_i}$. The minimization problem then becomes:

$$\underset{c}{\text{minimize}} \sum_{i} \sum_{j \in S_i} (l_j - F(l^{S_i})c)^2 + \lambda \|c\|^2 \quad (6)$$

This problem has a closed form solution, but new notations are needed. We first define $\text{rows}_S(M)$ for any set S and matrix or column vector M as the subset of rows of M whose index belongs to S. Using this definition, we define l and $\mathcal{F}$ as:

$$\ell = \begin{pmatrix} \text{rows}_{S_1}(l) \\ \text{rows}_{S_2}(l) \\ \vdots \end{pmatrix} \quad (7)$$

$$\mathcal{F} = \begin{pmatrix} \text{rows}_{S_1}(F(l^{S_1})) \\ \text{rows}_{S_2}(F(l^{S_2})) \\ \vdots \end{pmatrix} \quad (8)$$

The optimization problem now becomes:

$$\underset{c}{\text{minimize}} \|\ell - \mathcal{F}c\|^2 + \lambda\|c\|^2 \quad (9)$$

In this preferred embodiment, instead of regularizing the coefficients towards zero, we allow use, as prior knowledge, of the coefficients of a known propagation function such as the exponential ($e^{\alpha A}$). This leads to the following problem, where $c_0$ is the prior knowledge vector (which can be set equal to the null vector to fall back on Equation (9)):

$$\underset{c}{\text{minimize}} \|\ell - \mathcal{F}c\|^2 + \lambda\|c - c_0\|^2 \quad (10)$$

Imposing the gradient with regard to c to be the null vector, we obtain:

$$\frac{\partial}{\partial c} \|\ell - \mathcal{F}c\|^2 + \lambda\|c - c_0\|^2 = 0 \Leftrightarrow -2\mathcal{F}^T(\ell - \mathcal{F}c) + 2\lambda c - 2\lambda c_0 = \quad (11)$$
$$0 \Leftrightarrow (\mathcal{F}^T\mathcal{F} + \lambda I)c = \mathcal{F}^T\ell + \lambda c_0 \Leftrightarrow c = (\mathcal{F}^T\mathcal{F} + \lambda I)^{-1}(\mathcal{F}^T\ell + \lambda c_0)$$

where the suffix T denotes the transpose. c is the solution of a linear system of equations of size k, where k is the order of the Chebyshev expansion. In general, the value of k may set as desired for a given system depending, for example, on expected smoothness and continuity of the propagation function $f$ and other factors specific to the particular modelled system. A suitable value for k will be apparent to those skilled in the art for a given system. By way of example, however, k may typically lie in the range 1≤k≤1024, and more preferably lies in the range 2≤k≤32. Generally, the orthogonality of the Chebyshev polynomials, combined with the small radius of influence of nodes in most label propagation problems, allows use of small values such as k=16, making Equation (11) very easy to solve.

Figure 5:
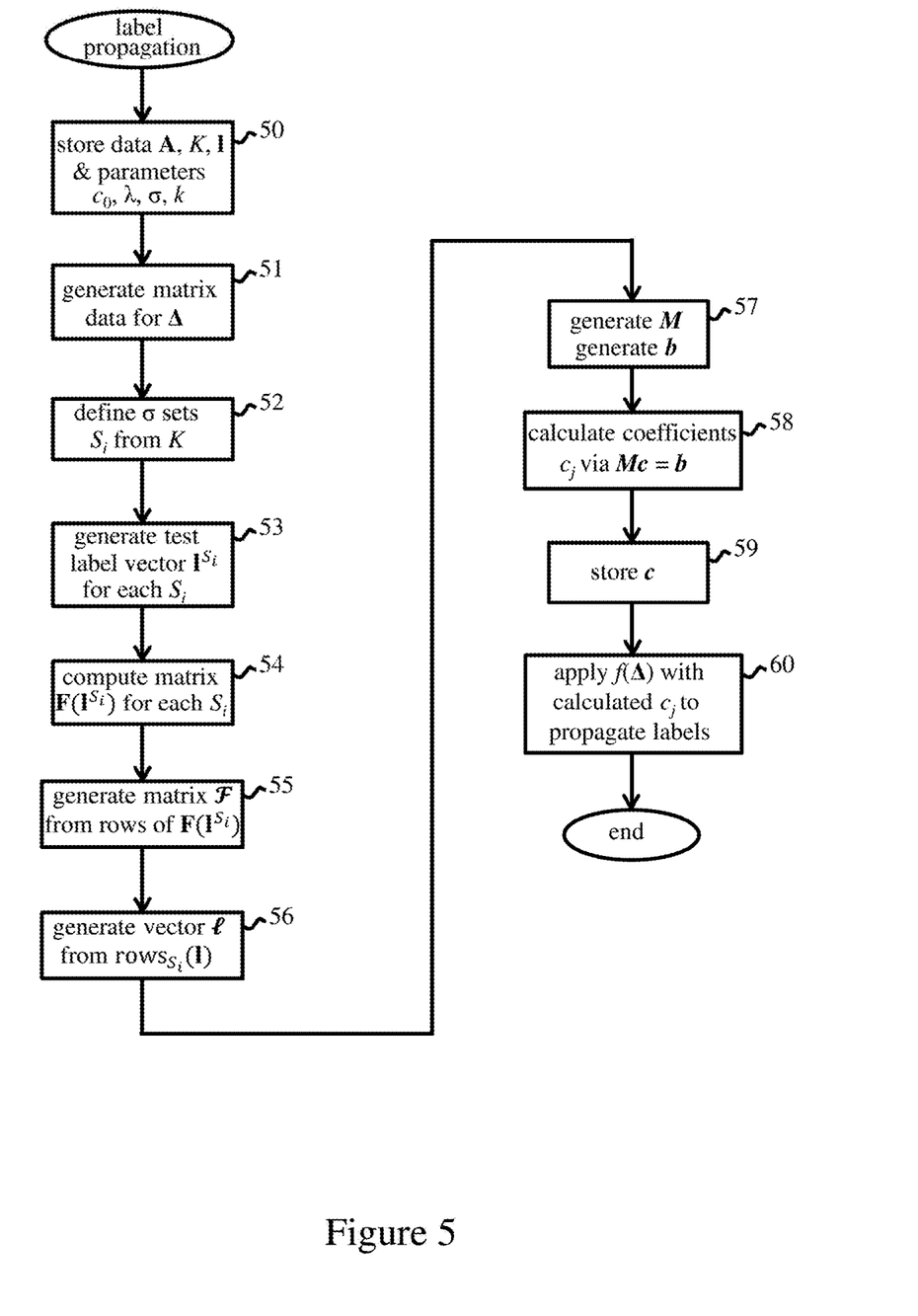
FIG. 5 indicates steps of a preferred label propagation method.

FIG. 5 indicates steps of the label propagation operation in this embodiment. (Again, the order of these steps may vary from that shown and steps may be performed in parallel where appropriate). In step 50, data defining the adjacency matrix A, the graph label vector l, the node set K, and parameters k, λ, σ, and $c_0$ defined above are stored in memory of the computing system. In step 51, the matrix data for the Laplacian matrix Δ is generated from the adjacency matrix A and stored in system memory. In step 52, the σ sets $S_i$ are defined from the node set K. In step 53, the test label data defining the test label vector $l^{S_i}$ is generated for each set $S_i$. In step 54, the matrix $F(l^{S_i})=P_j(\Delta)l^{S_i}$ is computed (see FIG. 4) for each set $S_i$. The expansion of the propagation function $f$ is thus inherently defined in this process. In step 55, the matrix $\mathcal{F}$ (Equation (8)) is generated by selecting rows from $F(l^{S_i})$ for the sets $S_i$. In step 56, the vector l (Equation (7)) is generated by selecting rows from the graph label vector l for each set $S_i$. In step 57, the computing system generates components $M \leftarrow \mathcal{F}^T\mathcal{F} + \lambda I$ and $b \leftarrow \mathcal{F}^T l + \lambda c_0$ of Equation 11. In step 58, the computing system calculates the optimal coefficients $c_j$ of the propagation function by solving the linear system of equations Mc=b. This solution can be obtained in well-known manner as will be apparent to those skilled in the art. The resulting coefficients c thus minimize a difference function $D=\|l-\mathcal{F}c\|^2+\lambda\|c-c_0\|^2$ as defined by Equation (10) above. The operation of foregoing steps 50 to 58 can be expressed by the following algorithm where the order of complexity of computational steps is indicated in brackets:

Require: A, K, l, $c_0$, λ, σ, k
1: Compute $\Delta \leftarrow I - D^{-0.5}AD^{-0.5}$
2: Split K into σ sets $S_i$
3: Initialize the |K| × k matrix $\mathcal{F}$
4: for all Set $S_i$ do
5:    Compute $l^{S_i}$
6:    for j = 1 → k do
7:       Compute $P_j(\Delta)l^{S_i}$                 (O(N))
8:       $\mathcal{F}(S_i, j) \leftarrow \text{rows}_{S_i}(P_j(\Delta)l^{S_i})$
9:    end for
10: end for
11: Compute l
12: Compute $M \leftarrow \mathcal{F}^T\mathcal{F} + \lambda I$              (O(nk²))
13: Compute $b \leftarrow \mathcal{F}^T l + \lambda c_0$                (O(nk))

| | |
|---|---|
| 14: Solve Mc = b | (O(k³)) |
| 15: return c | |

The complexity of this algorithm is dominated by the construction of the multiple $F(l^{S_j})$ matrices, each column of each of those matrices requiring multiplication of the graph matrix by a vector. The complexity is therefore $O(\sigma k N)$, where N is the number of edges.

Returning to FIG. 5, the coefficients c calculated in step 58 are stored in system memory in step 59. In step 60, the propagation function $f(\Delta)$ with the calculated coefficients $c_j$ can be used to propagate labels in the graph via Equation (1). Applying the resulting propagation function to the graph label vector l gives the predicted label vector $\hat{l}$. This includes predicted label values for the nodes in $\overline{K}$ whose label values are unknown. In the present example, predicted label values $\hat{l}_i$ for nodes $i \in \overline{K}$ may be values between 0 and 1 and can be viewed as ranking values, indicating likelihood of membership of the class $\mathcal{A}$, from which the assignment of nodes to $\mathcal{A}$ can be determined in various ways. New label values for a node in $\overline{K}$ can be set to $l_i=1 (i \in \mathcal{A})$ or $l_i=0$ ($i \notin \mathcal{A}$) for all or a subset of nodes in $\overline{K}$ in dependence on the ranking value $\hat{l}_i$ for that node. In the present example, all nodes are assumed either to belong or not belong to $\mathcal{A}$. Here, therefore, the new label value for a node in $\overline{K}$ may be set to $l_i=1$ if the ranking value $\hat{l}_i$ for that node is within a predetermined difference of 1, e.g. above a predetermined threshold value. The label value for the remaining nodes in $\overline{K}$ may then be set to $l_i=0$. In general, however, the setting of new label values based on ranking can be performed in numerous ways, e.g.: by selecting the x highest (or lowest) ranking values (where x is a predetermined number or percentage) and setting the new label value for nodes with those ranking values to the highest (or lowest) of the first and second label values; or by applying a predetermined cut-off threshold to the ranking values to assign a particular one of the first and second values to nodes. Various other options will be apparent to those skilled in the art, and the particular way in which ranking is used to set label values is orthogonal to overall operation of the label propagation process. Ranking values may be used to set label values for only some nodes in $\overline{K}$, leaving the other node labels undefined (unknown), or may be used to set the label value of all nodes in $\overline{K}$.

The above embodiment provides a fast and efficient method for propagating labels in any given graph. Complexity is linear in the number of edges N of the graph. Implementation of this technique has enabled computation of the propagation function in graphs of order 10 million nodes in less than 30 seconds on a single machine.

While the example above is based on binary classification, the technique is readily applicable to multi-class classification. A system with m classes can be rephrased as m one-versus-the-rest binary classification problems. For each problem, the coefficients c can be learned and a prediction vector $\hat{l}$ produced. The m prediction vectors can be combined into one classification in various ways, e.g. by classifying nodes according to their best ranking among all prediction vectors (e.g. if node i is ranked higher in the prediction vector of a class C than in any other prediction vector, it will be assigned to that class). The technique is also readily applicable to a seed set expansion problem where it is never known "for sure" that a node does not belong to a given class A (i.e. $K \cap \overline{A}=0$). In that case, l would be a vector of 1's ones and Equation (10) would not have a useful solution. However, based on the fact that, in most problems, |A| is small compared to the number of nodes of the graph (and hence the probability $P(i \in A | i \in K) << P(i \notin A | i \notin K)$) one can for example: (1) sample random nodes in $\overline{K}$ and assume that they do not belong to A; or (2) assume that none of the nodes in $\overline{K}$ belongs to A, but reduce the weight of this assumption in the optimization problem (partly to reflect the uncertainty of that assumption, and partly to avoid a problem of class imbalance). With the second approach, Equation (10) becomes:

$$\underset{c}{\text{minimize}} \, \|l - \mathcal{F}c\|^2 + \alpha \|\text{rows}_{\overline{K}} F(l)\|^2 + \lambda \|c - c_0\|^2 \quad (12)$$

where $\alpha$ is a real value fitting parameter, typically 1. The closed form solution of this new problem is easily derived, and the total complexity of the algorithm is not affected. This second approach was used in obtaining results described below.

Performance of the above embodiment is demonstrated by results illustrated in FIGS. 6 through 8 in which the embodiment (labelled "Our method") is compared with three known methods labelled as follows:

"Exponential" corresponds to the normalized Laplacian exponential diffusion described in "Kernels and regularization on graphs", Smola and Kondor, Learning theory and kernel machines, pages 144-158, Springer, 2003;

"LLGC" corresponds to the learning with local and global consistency diffusion method described in "Learning with local and global consistency", Zhou et al., Advances in neural information processing systems, 16(16):321-328, 2004; and "PPR" corresponds to the personalized pagerank method described in "Community membership identification from small seed sets", Kloumann and Kleinberg, Proceedings of the 20th ACM SIGKDD conference, pages 1366-1375, ACM, 2014.

Figure 6:
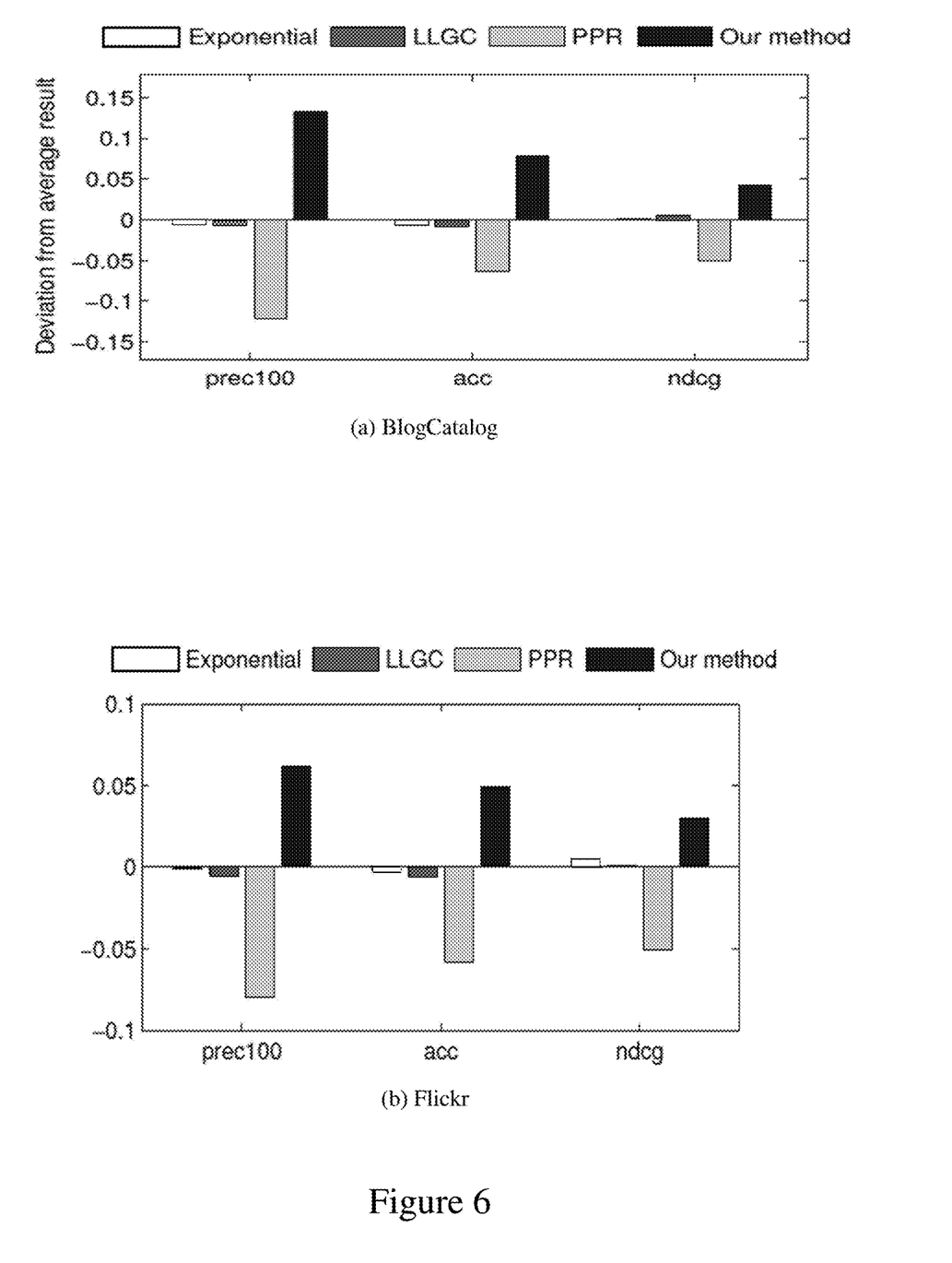
FIGS. 6 through 8 show comparative results of label propagation methods embodying the invention.

FIG. 6 shows results of applying the above methods for seed set expansion in social network datasets for which several true communities are known. For a given network and community, we randomly sampled 10% of the nodes belonging to the community and used them as seeds. The membership of the other 90% was kept hidden until evaluation. The seeds were used to learn a propagation function $f$ using our method described above. This function was then used to produce a prediction vector $\hat{l}=f(\Delta)l$ interpreted as a ranking of the nodes, from most likely to belong to the community to least likely. The ranking was compared to the true membership using the following metrics:

precision at 100 (abbreviated prec100)–fraction of true positives in the top100;

accuracy (abbreviated "acc")–precision at p, where p is the number of positives;

Normalized Discounted Cumulative Gain (NDCG).

For each network and community the experiment was run 10 times on different seed samples. To aggregate results meaningfully, we subtracted from the results of the average result obtained by all methods on the same community, and then averaged over those deviations from the mean. Charts (a) and (b) in FIG. 6 indicate the results for respective social networks with features indicated below:

the BlogCatalog network (no. of nodes n=10,312, no. of edges N=333,983, no. of labels=38, average label size=371);

the Flickr network (no. of nodes n=80,513, no. of edges N=5,899,882, no. of labels=195, average label size=553).

Figure 7:
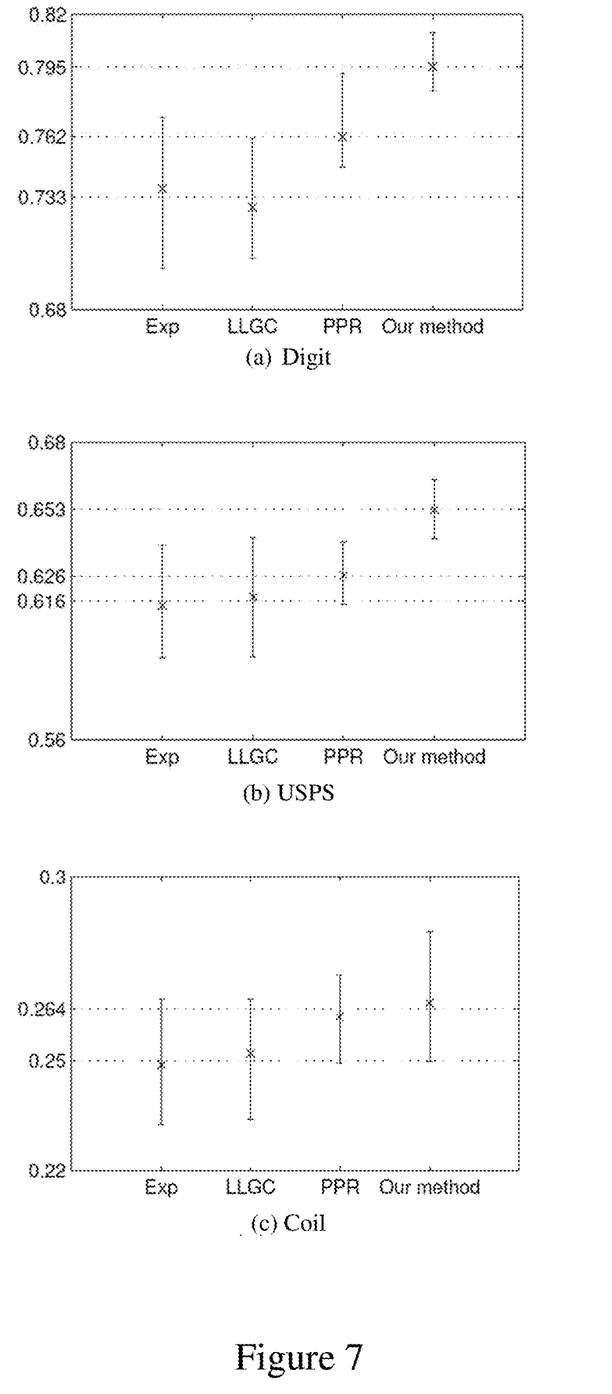

FIG. 7 shows results of applying the various methods to semi-supervised classification using three benchmark datasets (Digit, USPS and Coil) described in "Semi-supervised learning", Chapelle et al., 2006 and available online at http://olivier.chapelle.cc/ssl-book/benchmarks. Each datasets contains 1500 noisy 16×16 grey-scale bitmap images, each image associated to one category. We constructed an unweighted and undirected graph from each dataset as follows. The bitmap was read as a uni-dimensional vector and a fully-connected graph was first constructed by using the dot product as the weight of the edge. Then (at least) the 10 nearest neighbors of each image were kept as an unweighted and undirected edge in the final graph. The experiments were run with a training ratio of 10%. Plots (a) to (c) in FIG. 7 indicate percentage of correct classifications on the three datasets with the four methods. The cross indicates the mean over 40 runs and the error bars indicate first and third quartiles. On the Digit and USPS datasets our method outperforms all three baselines, while on the Coil dataset it outperforms the exponential diffusion and LLGC and is equivalent to the personalized pagerank.

Figure 8:
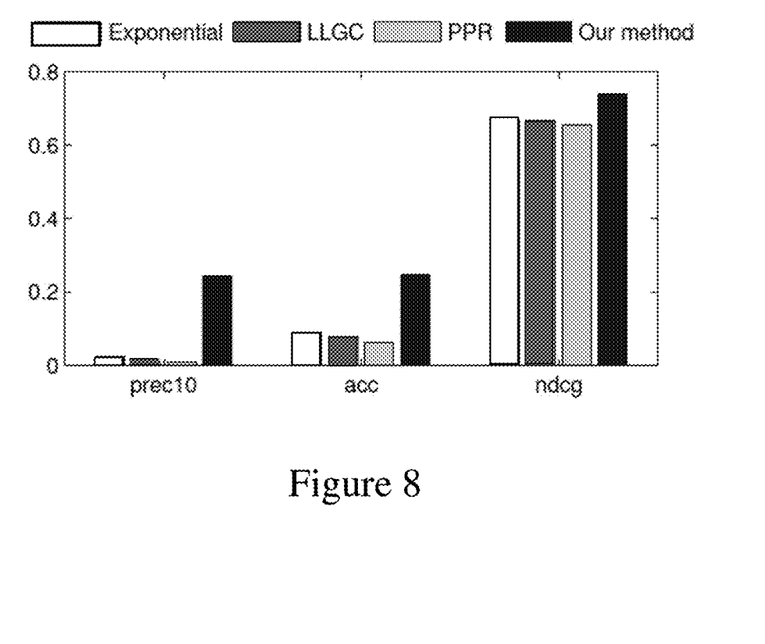

FIG. 8 shows results of applying the various methods to truly heterophilic graphs. We generated 10 graphs of 1000 nodes and about 10000 edges using the Erdos-Renyi random graph model. On each graph we generated a community A such that the probability of belonging to the community is inversely proportional to the number of members of that community in the direct neighborhood, or more precisely:

$$P[i \in A] = 1/(1 + \Sigma_{j \in A} a_{ij})$$

The resulting communities have about 250 members. We solved the same seed set expansion problem described previously. FIG. 8 shows the results, averaged over the 10 graphs, where the absolute values of the metrics are shown here. Because of the small size of the communities we show the precision at 10 rather than at 100. The traditional methods based on homophily are seen to perform poorly, with precision at 10 and accuracy close to 0%, and are clearly outperformed by our method.

It can be seen from the results that the method of the above embodiment outperforms standard baselines in both seed set expansion and semi-supervised learning. The method can deal easily with graphs of several hundred millions of edges and with strongly heterophilic systems.

Figure 9:
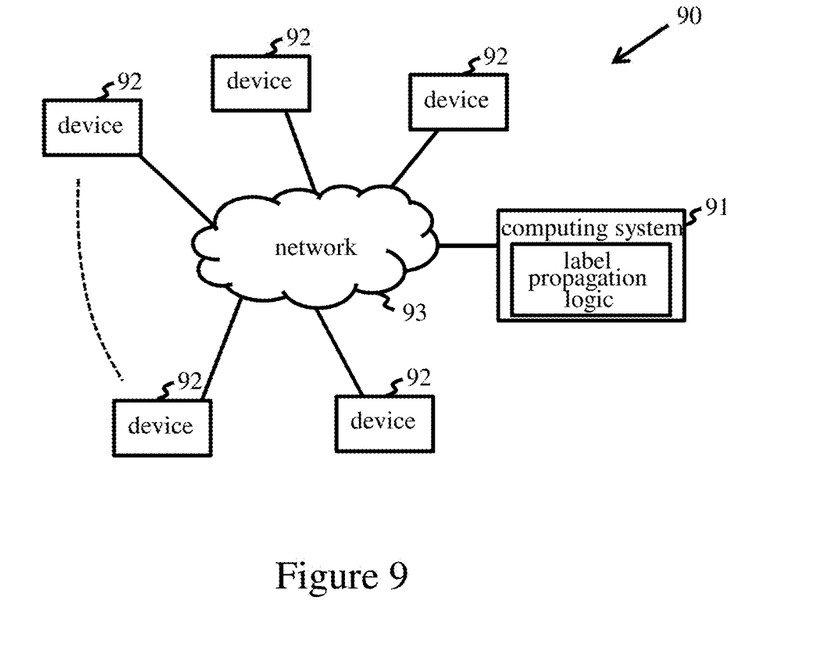
FIG. 9 is a generalized schematic of a networked system employing label propagation methods embodying the invention.

While results are presented for graphs based on specific datasets above, the label propagation methods described can be applied to graphs for numerous systems in science and technology, and the propagated labels can be applied to various effects in such systems. For example, the nodes of the graph may correspond to devices in a system of devices, and the label propagation method may involve controlling operation of the system of devices in dependence on the propagated labels. FIG. 9 is a generalized schematic of such a system 90 in which the label propagation process is performed by computing system 91 for a plurality of devices 92 interconnected by a network 93. Network 93 may in general comprise one or more component networks and/or internetworks, and may comprise wired and/or wireless links. Devices 92 in such a system may be devices connected to a data communications network such as servers, user computers, storage devices, peripheral devices, etc. in such a system. User computers here may comprise desktop, laptop or tablet computers, mobile phones, personal music players, palmtop devices, etc. In other embodiments, devices 92 may comprise network infrastructure devices, such as switches, routers, bridges, hubs, etc., or devices in a data processing network such as processors, memory devices, etc. in a parallel processing system, or machines (real or virtual) embodied in computers of a distributed processing system. In a further embodiment, devices 92 may comprise transmission devices in a power grid network.

Operation of system 90 may be controlled in a variety ways in dependence on propagated labels depending on the particular application scenario. Examples of control operations include: controlling data sent to devices in a data communications network, e.g. data to be displayed to a device user; controlling routing of data in a network; controlling logical organization of a network; controlling allocation of tasks in a system such as data processing network; controlling operation of transmission devices in a power grid, e.g. based on propagating labels relating to device failures to predict potential future failures and controlling allocation of power supply tasks accordingly; predicting device loading or requirements and controlling operation of the system accordingly; or otherwise controlling organization and/or functioning of the system based on labels. Computing system 91 may control operation of the device system directly, or the computing system may output new label values to the device system (e.g. to one or more devices thereof) for use in controlling system operation.

Thus, methods are provided for propagating labels in a graph having nodes, corresponding to items, and edges, connecting pairs of nodes, indicating correlation between items. Each node in a subset K of the nodes has an associated label value indicating a characteristic of the corresponding item. The method includes storing matrix data and graph label data in memory of a computing system. The matrix data defines a matrix X representing the graph. The graph label data defines a graph label vector l indicating label values associated with nodes of the graph, wherein the label value for each node in $\overline{K}$ (i.e. the subset of nodes which are not in K and for which the label value is unknown) is set to a predetermined value. The method includes, for at least one set S of nodes in K, generating in the computing system test label data defining a test label vector $l^S$ which corresponds to said graph label vector l but with the label value for each node in S set to said predetermined value. The method further includes defining in the computing system a propagation function $f(X)$ comprising a set of (k+1) basis functions $P_j(X)$, j=0 to k, having respective coefficients $c_j$. The method additionally includes calculating, in the computing system, the coefficients $c_j$ which minimize a difference function dependent on difference between the graph label vector l and a result of applying the propagation function $f(X)$ to the test label vector $l^S$ for said at least one set S. The method further comprises calculating, in the computing system, new label values for nodes in $\overline{K}$ by applying the propagation function $f(X)$ with the calculated coefficients $c_j$ to the graph label vector l, thereby propagating labels in the graph.

In other embodiments, nodes of the graph may correspond to data items (documents, files, objects, etc.,) in a database system, and operation of the database system may be controlled in dependence on propagated labels. Examples of control operations here include controlling selection and output of data items in response to input requests, or controlling organization of data items in data structures of the system. Particular examples of label propagation applications here include automatic classification of technical documents, automatic inference of units of numbers in technical documents, and identifying correspondence or relationships between documents.

There are of course numerous other applications for label propagation in a wide range of technical fields. As a further example, a graph may represent a protein interaction network and label propagation may be used to predict which protein is involved in a given vital process.

It will be appreciated that many changes and modifications may be made to the exemplary embodiments described above. By way of example, a different family of Chebyshev polynomials may be used in expansion of the propagation function $f$. Basis functions other than Chebyshev polynomials may also be used in other embodiments, e.g. Legendre polynomials or other types of orthogonal polynomials. Variations in the difference function D which is minimized to obtain the coefficients $c_j$ can also be envisaged.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for propagating labels in a graph having nodes, each node corresponding to a device in a system of devices, and edges, connecting pairs of nodes, indicating correlation between devices, each node in a subset K of the nodes having an associated label value indicating a characteristic of the corresponding device, the method comprising:
    storing matrix data in memory of a computing system, the matrix data defining a matrix X representing the graph, the graph representing the system of devices;
    storing graph label data in memory of the computing system, the graph label data defining a graph label vector l indicating label values associated with nodes of the graph, wherein the label value for each node and corresponding device in $\overline{K}$ is set to a predetermined value;
    for at least one set S of nodes in K, generating in the computing system test label data defining a test label vector $l^S$ which corresponds to said graph label vector l but with the label value for each node in S set to said predetermined value;
    defining in the computing system a propagation function $f(X)$ comprising a set of (k+1) basis functions $P_j(X)$, $j=0$ to k, having respective coefficients $c_j$, wherein said propagation function is defined as a Chebyshev expansion $f(X)=\Sigma_{j=0}^{k}c_jP_j(X)$ where $P_j$ is the $j^{th}$ Chebyshev polynomial;
    in the computing system, calculating the coefficients $c_j$ which minimize a difference function dependent on difference between said graph label vector l and a result of applying the propagation function $f(X)$ to the test label vector $l^S$ for said at least one set S;
    in the computing system, propagating labels for the corresponding node and corresponding device represented in the graph by calculating new label values for nodes in $\overline{K}$ by applying the propagation function $f(X)$ with the calculated coefficients $c_j$ to said graph label vector l; and
    controlling operation of a system of devices in dependence on said new label values, wherein the nodes of the graph correspond to the devices in the system of devices, wherein performance of said computing system is improved by a complexity of the method being linear in a count of said edges.

2. The method as claimed in claim 1 wherein k has a value in the range $1 \le k \le 1024$.

3. The method as claimed in claim 1 wherein said at least one set S comprises a plurality σ of sets.

4. The method as claimed in claim 1 wherein each node in said subset K has one of first and second label values.

5. The method as claimed in claim 4 wherein said step of calculating new label values comprises:
    applying the propagation function $f(X)$ with said calculated coefficients $c_j$ to said graph label vector l to produce a predicted label vector $\hat{l}$ which includes respective ranking values $\hat{l}_i$, $i \in \overline{K}$, for nodes in $\overline{K}$; and
    for each of at least a subset of nodes in $\overline{K}$, setting the new label value for that node to one of said first and second values in dependence on the ranking value $\hat{l}_i$ for that node.

6. The method as claimed in claim 4 wherein said step of calculating new label values includes setting the new label value for a node in $\overline{K}$ to said first value if the ranking value $\hat{l}_i$ for that node is within a predetermined difference of said first value.

7. The method as claimed in claim 1 including generating said matrix data defining said matrix X from an adjacency matrix A defining the graph.

8. The method as claimed in claim 1 wherein said devices are interconnected by a network.

9. The method of claim 1, wherein:
    the devices comprise transmission devices in a power grid network;
    in the step of propagating the labels, the labels relate to device failures predictive of potential future failures;
    the controlling operation comprises controlling operation of power supply tasks of the transmission devices in the power grid network based on the propagated labels.

10. The method of claim 1, wherein:
    the devices comprise transmission devices in a power grid network;
    in the step of propagating the labels, the labels relate to device loadings;
    the controlling operation comprises controlling operation of power supply tasks of the transmission devices in the power grid network based on the propagated labels.

11. A computer program product for propagating labels in a graph having nodes, each node corresponding to a device in a system of devices, and edges, connecting pairs of nodes, indicating correlation between devices, each node in a subset K of the nodes having an associated label value indicating a characteristic of the corresponding device, said computer program product comprising a computer readable storage medium having program instructions embodied therein, the program instructions being executable by a computing system to cause the computing system to:
    store matrix data defining a matrix X representing the graph, the graph representing the system of devices;
    store graph label data defining a graph label vector l indicating label values associated with nodes of the graph, wherein the label value for each node and corresponding device in $\overline{K}$ is set to a predetermined value and wherein each node in said subset K has one of first and second label values;

for at least one set S of nodes in K, generate test label data defining a test label vector $l^S$ which corresponds to said graph label vector l but with the label value for each node in S set to said predetermined value;

define a propagation function $f(X)$ comprising a set of (k+1) basis functions $P_j(X)$, j=0 to k, having respective coefficients $c_j$;

calculate the coefficients $c_j$ which minimize a difference function dependent on difference between said graph label vector l and a result of applying the propagation function $f(X)$ to the test label vector is for said at least one set S, wherein said step of calculating new label values comprises applying the propagation function $f(X)$ with said calculated coefficients $c_j$ to said graph label vector l to produce a predicted label vector $\hat{l}$ which includes respective ranking values $\hat{l}_i$, $i \in \overline{K}$, for nodes in $\overline{K}$; and for each of at least a subset of nodes in $\overline{K}$, setting the new label value for that node to one of said first and second values in dependence on the ranking value $\hat{l}_i$ for that node;

propagate labels for the corresponding node and corresponding device represented in the graph by calculating new label values for nodes in $\overline{K}$ by applying the propagation function $f(X)$ with the calculated coefficients $c_j$ to said graph label vector l; and control operation of a system of devices in dependence on said new label values, wherein the nodes of the graph correspond to the devices in the system of devices, wherein performance of said computing system is improved by a complexity of operations being linear in a count of said edges.

12. The computer program product as claimed in claim 11 wherein said program instructions are executable by the computing system to cause the computing system to define the propagation function as a Chebyshev expansion $f(X) = \Sigma_{j=0}^{k} c_j P_j(X)$ where $P_j$ is the $j^{th}$ Chebyshev polynomial.

13. The computer program product as claimed in claim 11 wherein said program instructions are executable by the computing system to cause the computing system to generate said test label data for a plurality σ of sets.

14. A method for propagating labels in a graph having nodes, each node corresponding to a data item in a database, and edges, connecting pairs of nodes, indicating correlation between data items, each node in a subset K of the nodes having an associated label value indicating a characteristic of the corresponding data item, the method comprising:

storing matrix data in memory of a computing system, the matrix data defining a matrix X representing the graph, the graph representing the data items in the database;

storing graph label data in memory of the computing system, the graph label data defining a graph label vector l indicating label values associated with nodes of the graph, wherein the label value for each node and corresponding data item in $\overline{K}$ is set to a predetermined value;

for at least one set S of nodes in K, generating in the computing system test label data defining a test label vector $l^S$ which corresponds to said graph label vector l but with the label value for each node in S set to said predetermined value;

defining in the computing system a propagation function $f(X)$ comprising a set of (k+1) basis functions $P_j(X)$, j=0 to k, having respective coefficients $c_j$, wherein said propagation function is defined as a Chebyshev expansion $f(X) = \Sigma_{j=0}^{k} c_j P_j(x)$ where $P_j$ is the $j^{th}$ Chebyshev polynomial;

in the computing system, calculating the coefficients $c_j$ which minimize a difference function dependent on difference between said graph label vector l and a result of applying the propagation function $f(X)$ to the test label vector $l^S$ for said at least one set S;

in the computing system, propagating labels for the corresponding node and corresponding data item represented in the graph by calculating new label values for nodes in $\overline{K}$ by applying the propagation function $f(X)$ with the calculated coefficients $c_j$ to said graph label vector l; and controlling operation of a database system in dependence on said new label values, wherein the nodes of the graph correspond to data items in the database system, wherein the controlling operation is one or more of controlling a selection and output of the data items in response to an input request and controlling an organization of the data items in data structures of the database, and wherein a performance of said computing system is improved by a complexity of said method being linear in a count of said edges.

15. The method as claimed in claim 14 wherein k has a value in the range 1≤k≤1024.

16. The method as claimed in claim 14 wherein each node in said subset K has one of first and second label values.

17. The method as claimed in claim 16 wherein said step of calculating new label values comprises:

applying the propagation function $f(X)$ with said calculated coefficients $c_j$ to said graph label vector l to produce a predicted label vector $\hat{l}$ which includes respective ranking values $\hat{l}_i$, $i \in \overline{K}$, for nodes in $\overline{K}$; and for each of at least a subset of nodes in $\overline{K}$, setting the new label value for that node to one of said first and second values in dependence on the ranking value $\hat{l}_i$ for that node.

18. A method for propagating labels in a graph having nodes and edges, each node corresponding to a data item in a database system, the data items comprising one or more of documents, files, and data objects, the edges connecting pairs of nodes, and indicating correlation between the data items, each node in a subset K of the nodes having an associated label value indicating a characteristic of the corresponding data item, the method comprising:

storing matrix data in memory of a computing system, the matrix data defining a matrix X representing the graph, the graph representing the database system;

storing graph label data in memory of the computing system, the graph label data defining a graph label vector l indicating label values associated with nodes of the graph, wherein the label value for each node and corresponding device in $\overline{K}$ is set to a predetermined value;

for at least one set S of nodes in K, generating in the computing system test label data defining a test label vector $l^S$ which corresponds to said graph label vector l but with the label value for each node in S set to said predetermined value;

defining in the computing system a propagation function $f(X)$ comprising a set of (k+1) basis functions $P_j(X)$, j=0 to k, having respective coefficients $c_j$, wherein said propagation function is defined as a Chebyshev expansion $f(X) = \Sigma_{j=0}^{k} c_j P_j(X)$ where $P_j$ is the $j^{th}$ Chebyshev polynomial;

in the computing system, calculating the coefficients $c_j$ which minimize a difference function dependent on difference between said graph label vector l and a result of applying the propagation function $f(X)$ to the test label vector is for said at least one set S;

in the computing system, propagating labels for the corresponding node and corresponding data item represented in the graph by calculating new label values for nodes in $\overline{K}$ by applying the propagation function $f(X)$ with the calculated coefficients $c_j$ to said graph label vector l; and controlling operation of the database system in dependence on said new label values, wherein performance of said computing system is improved by a complexity of said method being linear in a count of said edges.

19. The method of claim 18, wherein controlling operation of the database system in dependence on said new label values comprises controlling selection and output of one or more of the data items in response to input requests.

20. The method of claim 18, wherein controlling operation of the database system in dependence on said new label values comprises controlling organization of one or more of the data items.

21. The method of claim 18, wherein the data items comprise technical documents and controlling operation of the database system in dependence on said new label values comprises automatically classifying the technical documents.

22. The method of claim 18, wherein the data items comprise technical documents and controlling operation of the database system in dependence on said new label values comprises automatically inferring units of numbers in the technical documents.

23. The method of claim 18, wherein the data items comprise documents and controlling operation of the database system in dependence on said new label values comprises automatically identifying relationships among the documents.

24. The method of claim 18, wherein the database system is implemented on the computing system.

* * * * *